United States Patent
Studer et al.

(10) Patent No.: US 11,117,073 B2
(45) Date of Patent: Sep. 14, 2021

(54) FROTH COALESCING VENT

(71) Applicant: Hewlett-Packard Development Company, L.P., Houston, TX (US)

(72) Inventors: Anthony Studer, Corvallis, OR (US); Robert Wickwire, Corvallis, OR (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 47 days.

(21) Appl. No.: 16/093,440

(22) PCT Filed: Jul. 11, 2016

(86) PCT No.: PCT/US2016/041715
§ 371 (c)(1),
(2) Date: Oct. 12, 2018

(87) PCT Pub. No.: WO2018/013073
PCT Pub. Date: Jan. 18, 2018

(65) Prior Publication Data
US 2019/0168134 A1    Jun. 6, 2019

(51) Int. Cl.
| | |
|---|---|
| *B01D 19/00* | (2006.01) |
| *B41J 2/175* | (2006.01) |
| *B41J 2/19* | (2006.01) |
| *B01D 19/02* | (2006.01) |
| *B01D 69/02* | (2006.01) |
| *B01D 63/08* | (2006.01) |
| *B01D 69/06* | (2006.01) |

(52) U.S. Cl.
CPC ..... *B01D 19/0031* (2013.01); *B01D 19/0042* (2013.01); *B01D 19/02* (2013.01); *B01D 63/087* (2013.01); *B01D 69/02* (2013.01); *B01D 69/06* (2013.01); *B41J 2/175* (2013.01); *B41J 2/17563* (2013.01); *B41J 2/19* (2013.01); *B01D 2325/36* (2013.01)

(58) Field of Classification Search
CPC ............ B01D 19/0031; B01D 19/0042; B01D 19/02; B01D 2325/36; B01D 63/087; B01D 69/02; B01D 69/06; B01D 69/00; B41J 2/175; B41J 2/17563; B41J 2/19
See application file for complete search history.

(56) References Cited

U.S. PATENT DOCUMENTS

| | | |
|---|---|---|
| 5,536,413 A | 7/1996 | Bormann et al. |
| 6,234,621 B1 | 5/2001 | Musser et al. |
| 6,454,835 B1 | 9/2002 | Baumer |
| 7,188,937 B2 * | 3/2007 | Wilson ................ B41J 2/17513 347/85 |
| 7,238,224 B2 | 7/2007 | Kent |

(Continued)

FOREIGN PATENT DOCUMENTS

| | | |
|---|---|---|
| DE | 19941271 | 8/1999 |
| EP | 1219333 A1 | 7/2002 |

*Primary Examiner* — Jonathan Miller
*Assistant Examiner* — Gabriel E Gitman
(74) *Attorney, Agent, or Firm* — HP Inc. Patent Department

(57) ABSTRACT

An example device includes a defrothing portion to separate froth into a coalesced fluid and air, an air vent to vent the air from the defrothing portion, and a membrane on an outer surface of the defrothing portion, the membrane sealing the air vent. The membrane is formed of a material to prevent fluid from passing therethrough.

11 Claims, 7 Drawing Sheets

(56) References Cited

U.S. PATENT DOCUMENTS

| | | | |
|---|---|---|---|
| 7,429,101 B2 | 9/2008 | Petersen et al. | |
| 7,726,786 B2 | 6/2010 | Therien et al. | |
| 8,079,691 B2 | 12/2011 | Koehler et al. | |
| 10,661,201 B2 * | 5/2020 | Studer | B01D 29/05 |
| 10,661,577 B2 * | 5/2020 | Studer | B01D 19/0042 |
| 2004/0165040 A1 * | 8/2004 | Olsen | B01D 67/0088 |
| | | | 347/85 |
| 2006/0061637 A1 * | 3/2006 | Therien | B41J 2/175 |
| | | | 347/84 |
| 2006/0165935 A1 * | 7/2006 | Studer | B41J 2/17513 |
| | | | 428/40.1 |
| 2007/0006735 A1 * | 1/2007 | Olsen | B01D 19/0031 |
| | | | 96/188 |
| 2009/0231401 A1 * | 9/2009 | Morgan | B41J 2/185 |
| | | | 347/92 |
| 2010/0013896 A1 * | 1/2010 | Ishizawa | B41J 2/17566 |
| | | | 347/86 |
| 2010/0079559 A1 | 4/2010 | Justice et al. | |
| 2015/0283815 A1 * | 10/2015 | Igarashi | B41J 29/13 |
| | | | 347/85 |

\* cited by examiner

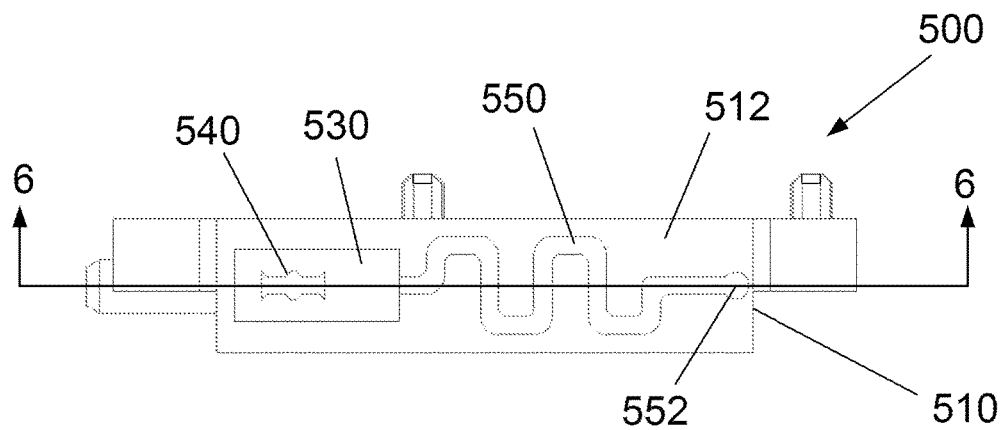
FIG. 5
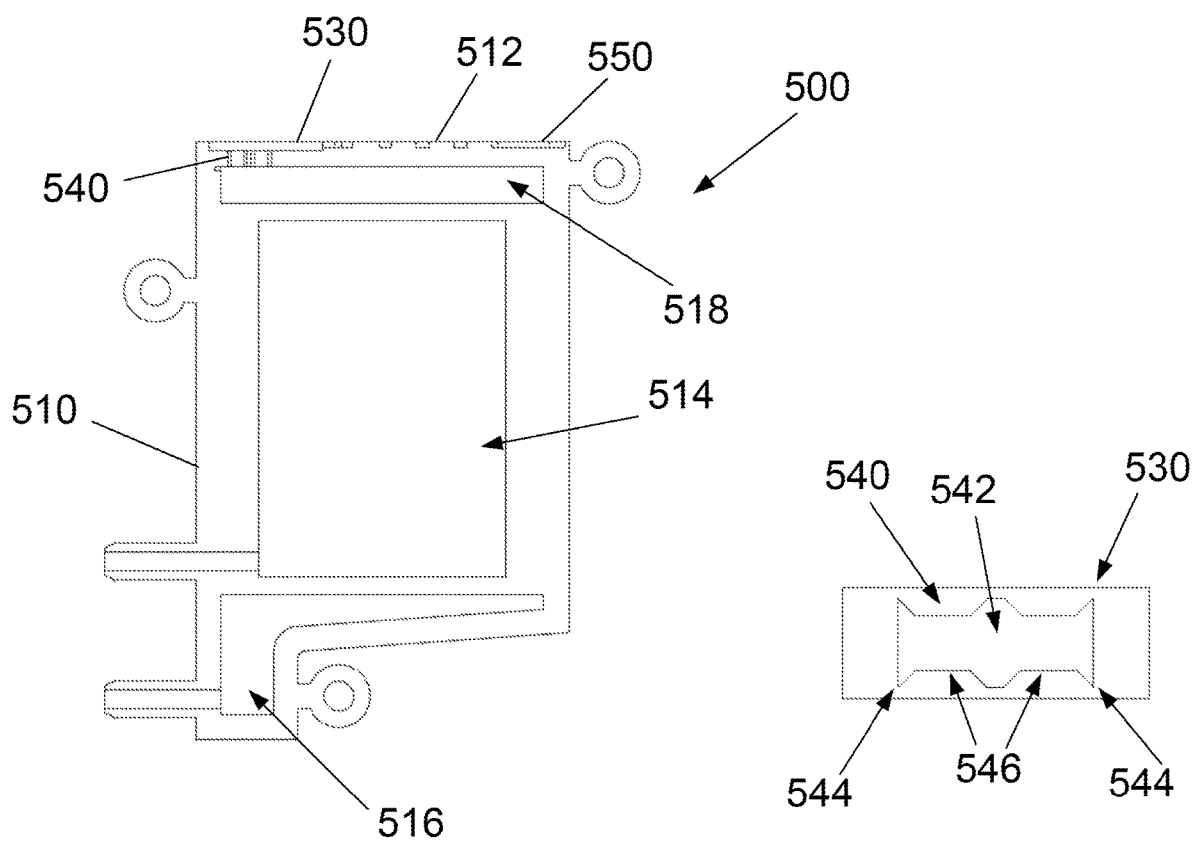
FIG. 6
FIG. 7

FROTH COALESCING VENT

BACKGROUND

Froth is a common occurrence in many fluids. Froth is a mass of bubbles in a fluid, or on the surface of the fluid. Froth can form as air is incorporated into the fluid. For example, in ink printing systems, as air is introduced into an ink reservoir to maintain pressure, froth may form in the corpus of the ink or on a surface of the ink. Froth is also found in other fluids, for example detergents or liquid soaps. Such froth may inhibit the operations of a system that processes fluids that are susceptible to froth formation

BRIEF DESCRIPTION OF THE DRAWINGS

For a more complete understanding of various examples, reference is now made to the following description taken in connection with the accompanying drawings in which:

FIG. 5 is a top plan view of an example defrothing device;

FIG. 6 is a cross-sectional view of the example defrothing device of FIG. 5 taken along 6-6;

FIG. 7 is a detailed plan view of an example vent structure for the example defrothing device of FIG. 5;

DETAILED DESCRIPTION

Various examples described herein provide for coalescing of fluid in a froth. In one example, a device receives a froth, as may be formed in a fluid such as ink, and separates the froth into a coalesced fluid and air. The coalesced fluid may be collected and re-circulated to a fluid reservoir, such as an ink supply, and the air may be vented to the atmosphere. In one example, the air is directed out of the defrothing device through an air vent extending to the outside surface of the defrothing device. A membrane is provided on the outside surface covering the air vent. The membrane allows air to pass therethrough, but prevents any fluid that may have reached the air vent from passing therethrough. In some examples, a labyrinth may be formed on the outside surface and may be in fluidic communication with the air vent. The labyrinth provides a long narrow channel which may facilitate venting of air but minimizing fluid loss by reducing evaporation of the fluid. A cover with air-barrier properties may be provided to cover at least a portion of the labyrinth.

As described above, froth may be found in many fluids. For example, in printing systems, a backpressure may be desirable in an ink printhead. To maintain this pressure, air is introduced into the printhead. The mixture of the ink and air generates froth within the printhead. While specific reference is made to froth in an ink printhead, such froth can exist in any fluid processing system. For example, some devices such as industrial cleaning devices use liquid detergent to clean components of the system. These devices similarly contain a froth layer due to the incorporation of air, surfactants, or other components.

Such froth can impact the functionality of the system. For example, in an ink system, froth may reduce the accuracy of certain sensors such as an ink-level gauge or a sensor that indicates that the system is out of ink. The accuracy of these sensors and gauges impacts user satisfaction, system performance, and system reliability. More specifically, the froth present in an ink supply could prematurely trigger an out-of-ink sensor. Such a premature triggering of the sensor could lead to the replacement of an ink supply prior to its exhaustion, which is an inefficient use of ink and may create an impression on the customer that an ink supply drains sooner than it actually does. In some cases, premature triggering of an ink sensor could also lead to failure of the printing system.

Accordingly, the present disclosure describes example devices and methods for coalescing a frothy fluid into coalesced fluid and air. Specifically, the present disclosure describes devices which include a defrothing portion to separate the froth into coalesced liquid and air. The air is allowed to vent, while loss of the fluid through the air vent is reduced, minimized or eliminated.

Figure 1:
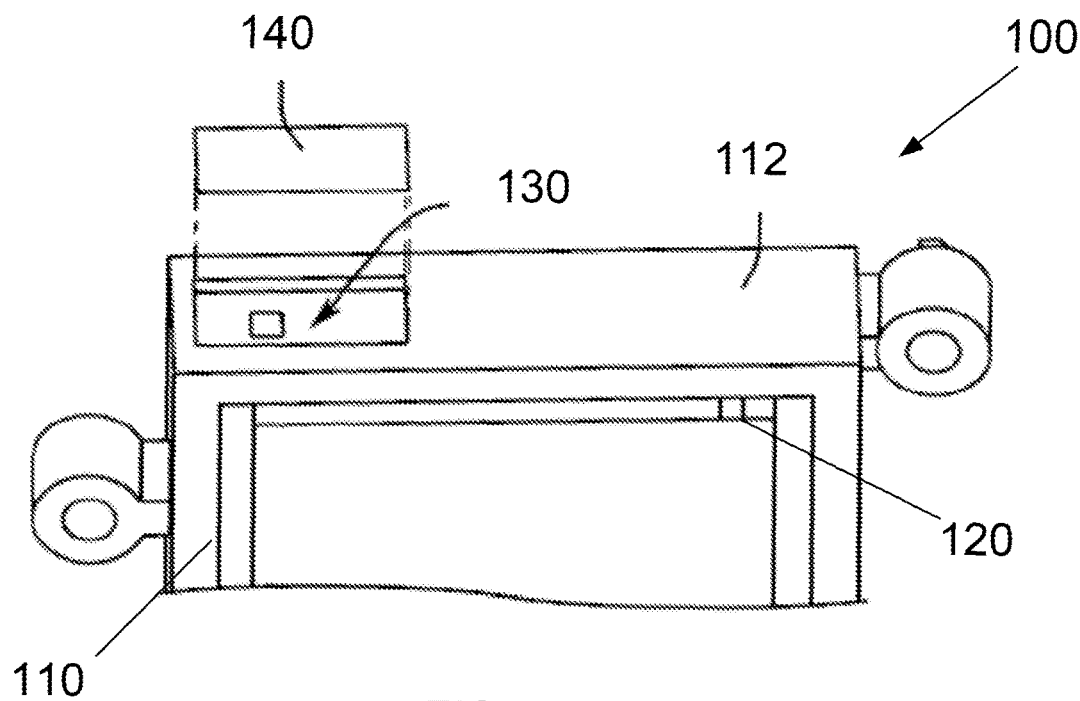
FIG. 1 is a perspective view of an example defrothing device.

Referring now to the figures, FIG. 1 illustrates an example defrothing device. The example defrothing device 100 is provided with a defrothing portion 110. As described with reference to various examples below, the defrothing portion 110 may receive froth and separate the froth into coalesced fluid (e.g., a liquid) and air. While the coalesced fluid may drop to the bottom of the defrothing portion 110 due to gravity, the air may travel to the top of the defrothing portion 110. Accordingly, the example defrothing device 100 is provided with a vent 120 at the top of the defrothing portion 110 which may be in fluidic communication with a vent 130 leading to an outer surface 112 of the example defrothing device 100. In the example illustrated in FIG. 1, the vent 130 may be circular is shape and have a diameter of between about 1 mm and about 3 mm or, or more preferably, between about 1.5 mm and about 2 mm Thus, the air separated from the froth may be vented to the atmosphere, for example.

In various examples described herein, a membrane 140 may be provided on the outer surface 112 of the example defrothing device 100. The membrane 140 is positioned to substantially completely cover and seal the air vent 130. In this regard, the membrane 140 may be adhered to the outer surface 112 of the example defrothing device 100 in any of a variety of manners.

The membrane 140 is formed of a material which allows air to pass therethrough but prevents a fluid, such as liquid ink, from passing therethrough. In one example, the membrane 140 is formed of an oleophobic material which inhibits, reduces or minimizes passage of water, oil or other fluids therethrough. Thus, if fluid accumulates in the vent or reaches through the vent 130 to the outer surface 112 of the example defrothing device 100, the fluid is not allowed to escape. In this regard, accidental spills of the fluid may be avoided during, for example, transport or installation of the example defrothing device 100 or a system in which the example defrothing device 100 is installed.

Figure 2:
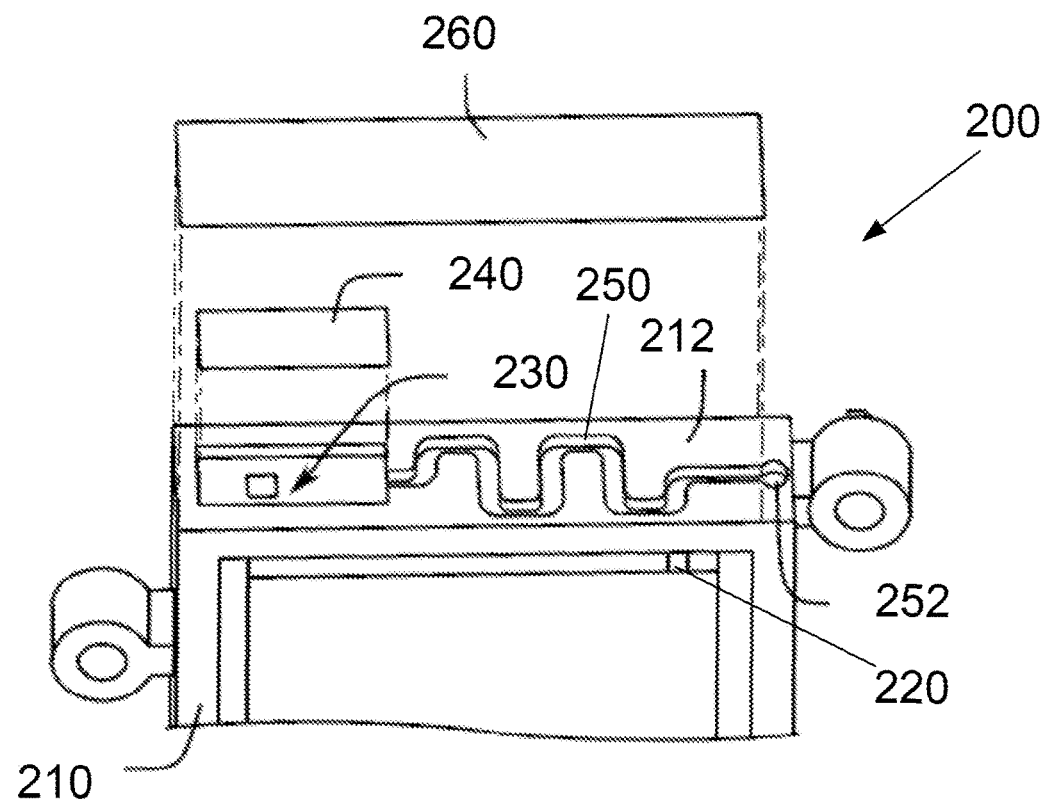
FIG. 2 is a perspective view of another example defrothing device.

Referring now to FIG. 2, another example defrothing device is illustrated. The example defrothing device 200 of FIG. 2 is similar to the example defrothing device 100 of FIG. 1. In this regard, the example defrothing device 200 of FIG. 2 includes a defrothing portion 210, air vents 220, 230 and a membrane (e.g., an oleophobic membrane) 240 positioned on the outer surface 212 of the example defrothing device 200.

In the example of FIG. 2, a labyrinth 250 is formed on the outer surface 212 of the example defrothing device 200. The labyrinth 250 extends from the vent 230 to a termination vent 252. In this regard, the labyrinth 250 is in fluidic communication with the air vent 230. A cover 260 is mounted on the outer surface 212 of the example defrothing device 200 and covers at least a part of the labyrinth 250. In the example illustrated in FIG. 2, the cover 260 is positioned to cover substantially the entire labyrinth 250, but allows the termination vent 252 to be exposed to the atmosphere.

In various examples, the cover 260 is formed of a material with air-barrier properties. In this regard, the cover 260 reduces the water vapor transmission rate (WVTR) from the example defrothing device 200. Further, the labyrinth 250 forms a long path with a small cross-sectional area to slow down the evaporation rate of any fluid that may have reached the labyrinth 250. In various examples, the length of the labyrinth 250 may cover a length of at least about 30 mm, and the cross-sectional area of the labyrinth 250 may be less than about 1 mm$^2$, but both values may be selected based on the desired reduction in WVTR.

Thus, if fluid reaches the labyrinth 250 or accumulates in the air vent 230, the evaporation rate of the fluid is reduced by creation of a gradient between a fully humidified region at the beginning of the labyrinth 250 near the vent 230 and atmospheric air at the termination vent 252 at the end of the labyrinth 250.

In one example, the example defrothing device 200 of FIG. 2 may be provided with a single component in place of the membrane 240 and the cover 260. In one example, the membrane 240 may be removed, and the cover 260 may be provided to sufficiently cover the vent 230 and the labyrinth 250.

Figure 3:
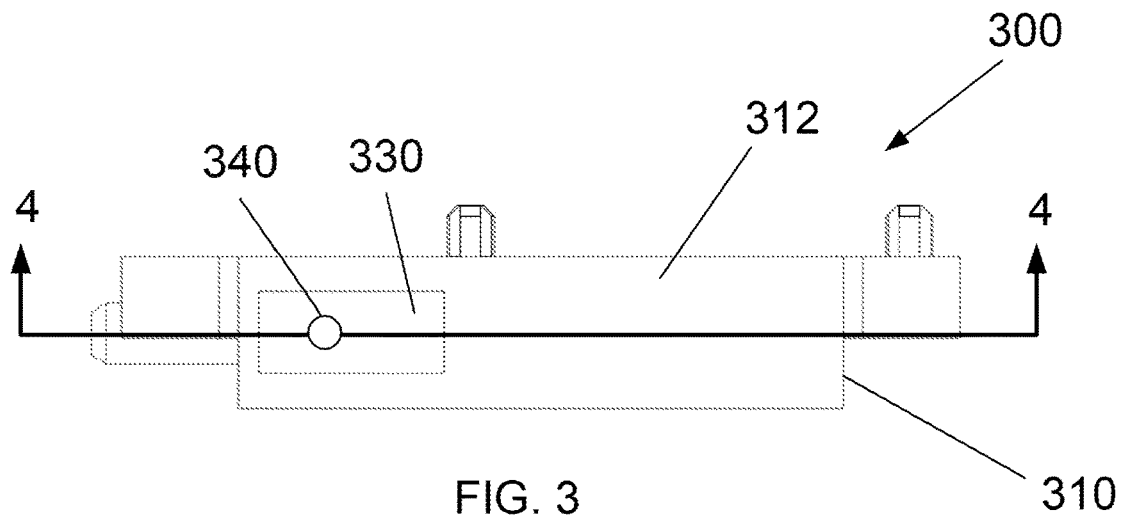
FIG. 3 is a top plan view of an example defrothing device.
Figure 4:
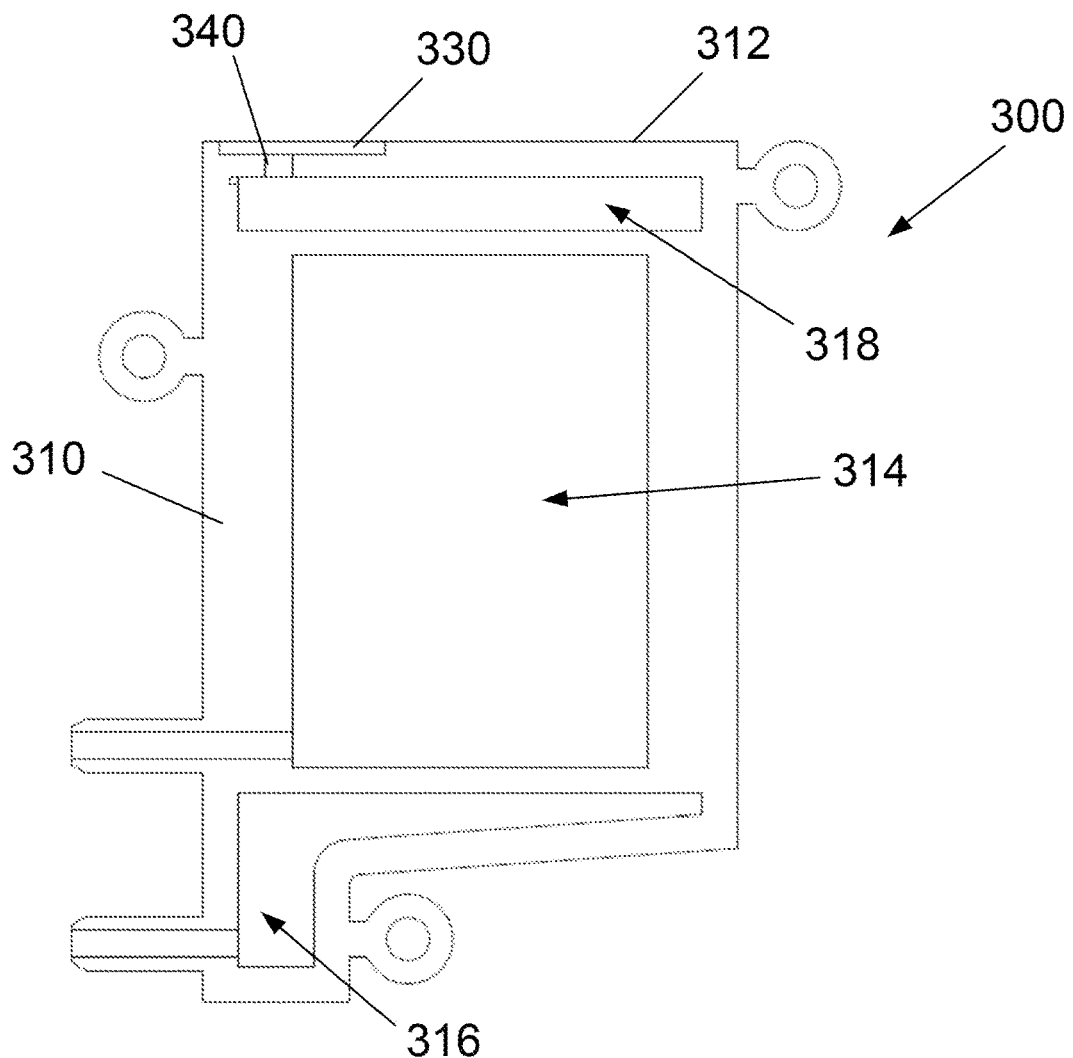
FIG. 4 is a cross-sectional view of the example defrothing device of FIG. 3 taken along 4-4.

Referring now to FIGS. 3 and 4, an example defrothing device with a vent structure is illustrated. FIG. 3 provides a top plan view of the example defrothing device 300, and FIG. 4 provides a cross-sectional view of the example defrothing device 300 taken along 4-4. The example defrothing device 300 is provided with a defrothing portion 310 and an outer surface 312. The defrothing portion 310 includes a chamber 314 into which the froth may be directed for separation into a coalesced fluid and a gas. The coalesced fluid may be directed downward by gravity and collected in a sump portion 316 positioned near the bottom portion of the example defrothing device 300. The separated gas may be directed upward out of the chamber 314 through a vent (not shown in FIGS. 3 and 4) into an upper chamber 318. The gas may then escape the example defrothing device 300 through a vent 330. In the example defrothing device 300 of FIGS. 3 and 4, the vent 330 is provided with a vent channel 340 that has a substantially circular cross section and extends from the upper chamber 318 to the vent 330 on the outer surface 312 of the example defrothing device 300.

As described above with reference to FIG. 1, a membrane may be provided on the outer surface 312 to seal the vent 330. The membrane is not shown in FIGS. 3 and 4 for purposes of clarity.

In the example defrothing device 300 of FIGS. 3 and 4, the upper chamber 318 and the vent 330 provide a path for the gas to exit the example defrothing device 300. In certain cases, froth (including gas and fluid) may travel into the upper chamber 318 and the vent. In such cases, there is a risk that the froth (e.g., bubbles) or the fluid may block the vent 330 or the vent channel, thereby preventing gas from escaping therethrough. Certain examples of the present disclosure may provide features to mitigate this risk.

For example, FIGS. 5 and 6 illustrate an example defrothing device 500 with a vent structure having features which facilitate reducing the risk of blocking of the vent by froth or fluid. FIG. 5 provides a top plan view of the example defrothing device 500, and FIG. 6 provides a cross-sectional view of the example defrothing device 500 taken along 6-6. The example defrothing device 500 is provided with a defrothing portion 510 and an outer surface 512. The defrothing portion 510 includes a chamber 514 into which the froth may be directed for separation into a coalesced fluid and a gas. The coalesced fluid may be directed downward by gravity and collected in a sump portion 516, and the separated gas may be directed upward out of the chamber 514 through a vent (not shown in FIGS. 5 and 6) into an upper chamber 518. The gas may then escape the example defrothing device 500 through a vent 530 and a labyrinth 550 with a termination vent 552. As noted above with reference to FIG. 2, in various examples, a membrane and/or a cover may be provided to seal the vent 530 and/or the labyrinth 550.

In the example of FIGS. 5 and 6, the vent 530 is provided with a vent channel 540 that extends from the upper chamber 518 to the vent 530 on the outer surface 512. Unlike the vent channel 340 described above with reference to FIG. 3, the vent channel 540 of FIGS. 5 and 6 is provided with a non-circular cross section. In one example, the vent channel 540 is provided with a cross section that has at least one corner, as most clearly illustrated in FIG. 5. In other examples, the cross section of the vent channel 540 includes at least one polygonal shape.

In this regard, FIG. 7 provides a detailed plan view of the example vent structure 530 of FIG. 5. As noted above, the vent structure 530 includes a vent channel 540 which extends to the outer surface 512 of the example defrothing device 500. The vent channel 540 includes a polygonal section 542 in the middle of the cross section of the vent channel 540. In the illustrated example, the polygonal section 542 is provided with a substantially octagonal shape. The polygonal section 542 illustrated in FIG. 7 forms at least four corners and provides a lower likelihood of complete blockage by froth or fluid when compared to a circular cross-section.

Further, the vent channel 540 includes end portions 544 which include corners which may further prevent blockage by froth or fluid. In the example of FIG. 7, the end portions 544 include sharp corners forming acute angles which discourage froth or liquid from settling therein. A rectangular connector portion 546 is provided between each end portion 544 and the polygonal section 542. The substantially straight edges of the rectangular connection portion 546 also prevents froth or fluid from completely blocking flow of gas therethrough.

Of course, the specific cross-sectional shape of the vent channel 540 illustrated in FIG. 7 is only an example. Other shapes which inhibit complete blockage of the vent channel 540 are possible and are contemplated within the scope of the present disclosure.

Figure 8:
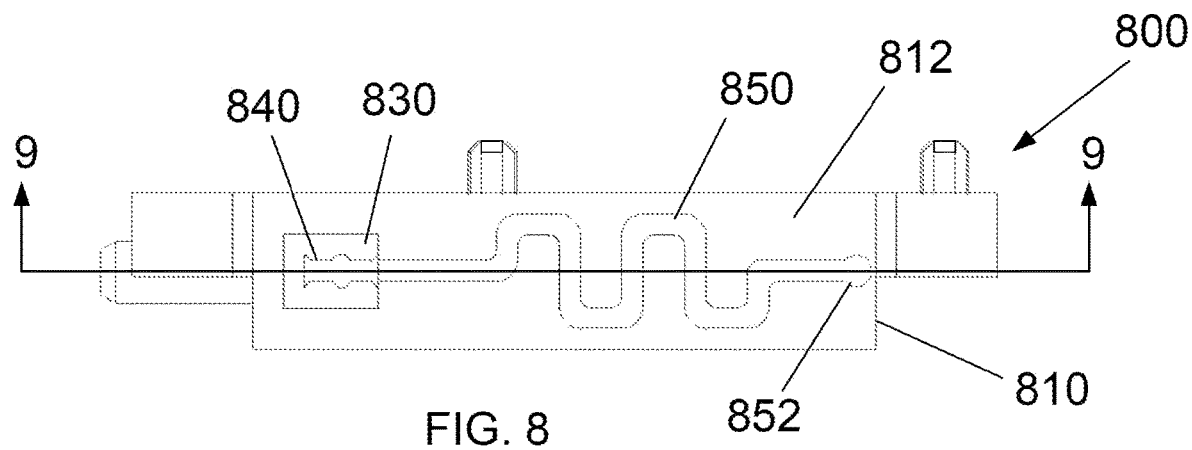
FIG. 8 is a top plan view of an example defrothing device.
Figure 9:
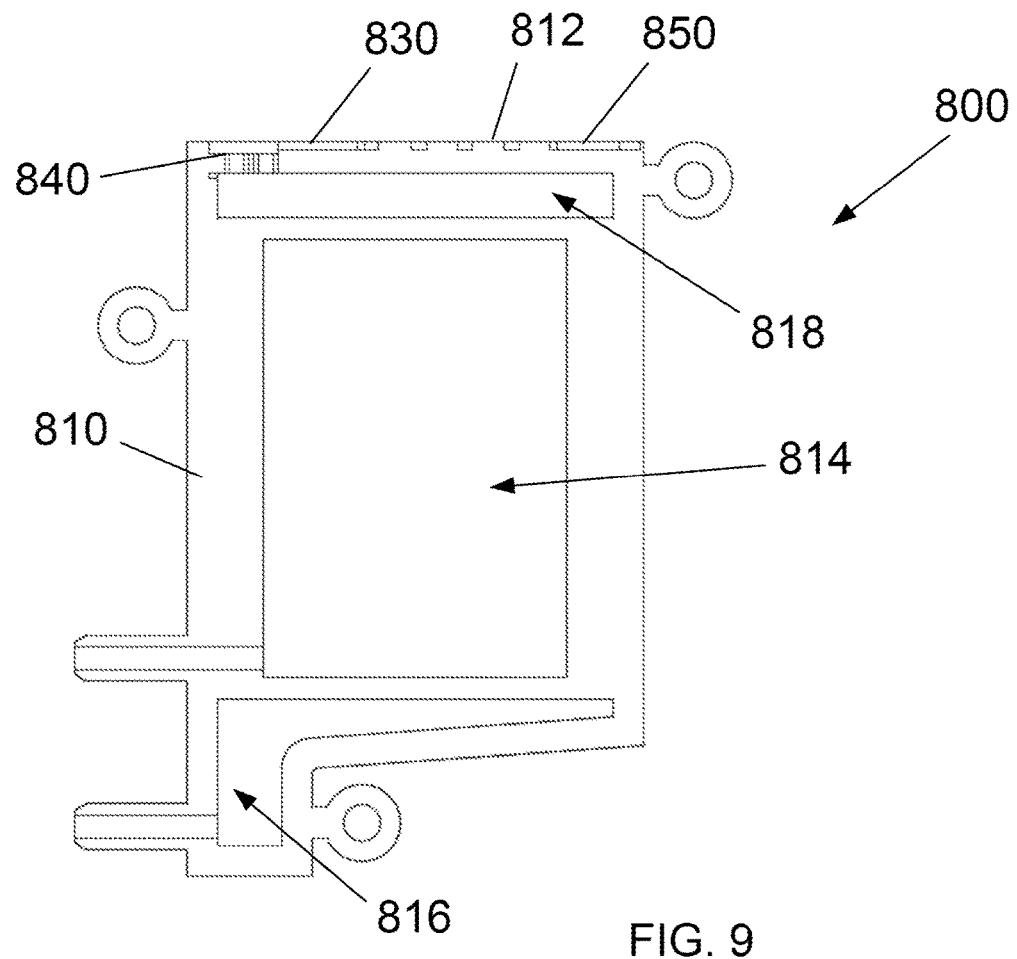
FIG. 9 is a cross-sectional view of the example defrothing device of FIG. 8 taken along 9-9.

Referring now to FIGS. 8 and 9, another example defrothing device with a vent structure is illustrated. FIG. 8 provides a top plan view of the example defrothing device 800, and FIG. 9 provides a cross-sectional view of the example defrothing device 800 taken along 9-9. The example defrothing device 800 is provided with a defrothing portion 810 and an outer surface 812. The defrothing portion 810 includes a chamber 814 into which the froth may be directed for separation into a coalesced fluid and a gas. The coalesced fluid may be directed downward by gravity and collected in a sump portion 816, and the separated gas may be directed upward out of the chamber 814 through a vent (not shown in FIGS. 8 and 9) into an upper chamber 818. The gas may then escape the example defrothing device 800 through a vent 830 and a labyrinth 850. As noted above, in various examples, a membrane and/or a cover may be provided to seal the vent 830 and/or the labyrinth 850.

In the example of FIGS. 8 and 9, the vent 830 is provided with a vent channel 840 having a configuration similar to that described above with reference to FIG. 7. In the example of FIGS. 8 and 9, the vent channel 840 is directly coupled to the labyrinth 850. In this regard, the vent channel 840 is positioned on one edge of the vent 830, and the labyrinth 850 begins at the same edge of the vent 830 and ends with a termination vent 852. The direct coupling of the vent channel 840 to the labyrinth 850 may further reduce the risk of complete blockage of a vent path by froth or fluid.

Figure 10:
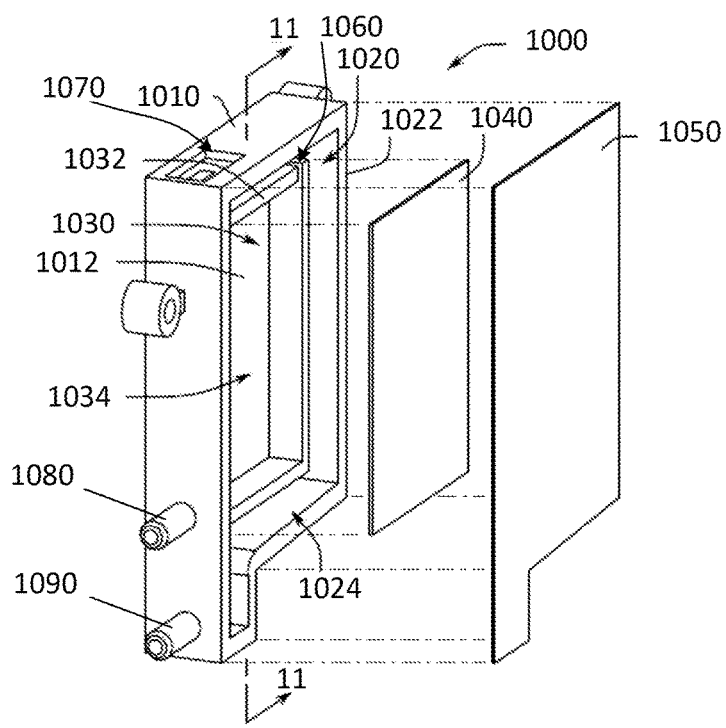
FIG. 10 is a perspective, exploded view of an example defrothing device.
Figure 11:
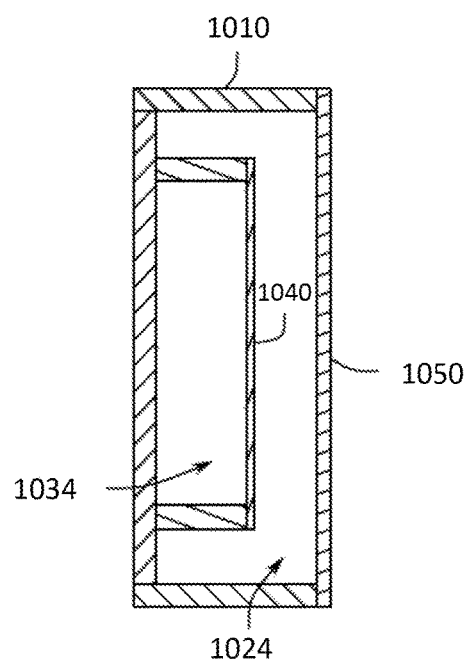
FIG. 11 is a cross-sectional view of the example defrothing device of FIG. 10 taken along 11-11.

Referring now to FIGS. 10 and 11, an example defrothing device 1000 is illustrated. The example device 1000 includes a frame 1010 with various features formed therein. For purposes of clarity, the membrane covering the air vent is not shown in FIG. 3. In the example illustrated in FIGS. 10 and 11, the frame 1010 is generally in the shape of a rectangular box, but various other shapes are possible and are contemplated within the scope of the present disclosure. In various examples, the frame 1010 may be formed of a molded plastic or various other materials. Various features of the frame are provided to facilitate coalescing of a froth directed into the frame 1010.

In the example illustrated in FIGS. 10 and 11, the frame 1010 is provided with a wall 1012 on one side of the frame 1010. The opposite side of the frame 1010 is open and provided with an outer opening 1020 defined by an outer rim 1022 which substantially forms the perimeter of the outer opening 1020. In the example of FIGS. 10 and 11, the outer rim 1022 of the outer opening 1020 is also the outer perimeter of the frame 1010. In other examples, the outer rim 1022 of the outer opening may be separate from the outer-most portion of the frame.

The example frame 1010 of the example defrothing device 1000 of FIGS. 10 and 11 further includes an inner opening 1030 defined by an inner rim 1032 which substantially forms the perimeter of the inner opening 1030. The inner opening 1030 of the example frame 1010 is recessed from the outer opening 1020, as most clearly illustrated in the cross-sectional view of FIG. 11. In this regard, the distance between the wall 1012 of the frame 1010 and the outer rim 1022 is greater than the distance between the wall 1012 and the inner rim 1032.

As shown in the exploded view of FIG. 10 and the cross-sectional view of FIG. 11, a filter screen 1040 is mounted on the perimeter of the inner opening 1030 to form an inner chamber 1034. In this regard, the filter screen 1040 may be mounted to the inner rim 1032 in any of a variety of manners. For example, the filter screen 1040 may be attached by heat staking it the inner rim 1032. Of course, other manners of attachment of the filter screen 1040 are possible and are contemplated within the scope of the present disclosure.

The filter screen 1040 may be formed of a variety of materials, including metal or plastic, for example. As described in greater detail below, the filter screen 1040 may be used to dissipate bubbles in a froth that may be introduced into the inner chamber 1034. In this regard, the filter screen 1040 may include pores to allow coalesced fluid to pass therethrough but prevents froth (e.g., bubbles) from passing. The size, shape and distribution of the pores in the filter screen 1040 may be selected based on a variety of factors such as the type of fluid and expected flow rate of the froth, for example. Similar factors may be used to select the size and shape of the inner chamber 1034. For example, a larger and taller inner chamber 1034 may be desirable for a higher flow rate of froth therethrough.

Referring again to FIGS. 10 and 11, the example defrothing device 1000 is provided with a cover layer 1050 mounted on the perimeter of the outer opening 1020 to form an outer chamber 1024. In this regard, the cover layer 1050 may be mounted to the outer rim 1022 in any of a variety of manners, such as by heat staking it the outer rim 1022. Of course, other manners of attachment are possible and are contemplated within the scope of the present disclosure. The cover layer 1050 may be formed of a variety of materials that prevent a fluid from passing therethrough. For example, the cover layer 1050 may be a film formed of a metal or a plastic.

Thus, as most clearly illustrated in the cross-sectional view of FIG. 11, the inner chamber 1034 is defined at least in part by the wall 1012 of the frame 1010 on a first side and the filter screen 1040 on a second side, the second side being opposite the first side. Similarly, the outer chamber 1024 is defined at least in part by the filter screen 1040 on one side and the cover layer 1050 on the opposite side. Thus, the filter screen 1040 separates the inner chamber 1034 and the outer chamber 1024.

Referring again to FIG. 10, the frame 1010 is provided with vents 1060, 1070, an inlet port 1080 and an outlet port 1090. The inlet port 1080 is positioned near the bottom portion of the frame and extends into the inner chamber 1034. Thus, froth may be directed into the inner chamber 1034 through the inlet port 1080. Similarly, the outlet port 1090 is positioned near the bottom portion of the frame and extends out of the outer chamber 1024 to allow coalesced fluid to be directed out of the outer chamber 1024. The vents 1060, 1070 allow air to escape from the defrothing device 1000. Thus, as the froth is separated in the inner chamber 1034 and the coalesced fluid passes through the filter screen 1040 into the outer chamber 1024, the remaining air may be vented from the inner chamber 1034 through the vent 1060 and to the atmosphere through the vent 1070.

Figure 12:
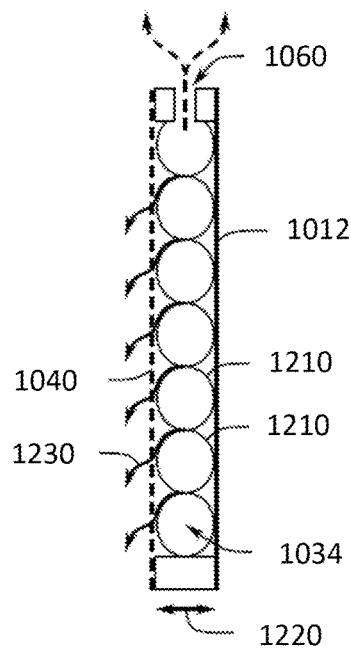
FIG. 12 is a schematic illustration of the example defrothing device of FIG. 10 illustrating various operating principles.

Referring now to FIG. 12, a schematic illustration of the example defrothing device 1000 of FIGS. 10 and 11 illustrates principles of defrothing. For purposes of simplicity, FIG. 12 illustrates only a portion of the defrothing device 1000, including the wall 1012, the filter screen 1040, the inner chamber 1034, and the vent 1060. Froth is illustrated in the inner chamber 1034 in the form of bubbles 1210.

As illustrated in FIG. 12, the width of the inner chamber 1034 between the wall 1012 of the frame 1010 and the filter screen 1040 is sized to facilitate coalescing of the fluid in the froth. In the example of FIG. 12, froth enters at a low point of the inner chamber 1034 and is driven up the inner chamber 1034. In the example of FIG. 12, the width 1220 of the inner chamber 1034 is sized to accommodate bubbles in the froth such that the bubbles are substantially in a single-wide formation. This arrangement speeds the bubbles through the inner chamber and facilitates thinning of the bubbles 1210. The width 1220 of the inner chamber 1034 may also cause exertion of pressure on the walls of the bubbles 1210, thus abrading the bubbles 1210 against the rough porous surface of the filter screen 1040, causing rupture of the surface of the bubbles 1210. Once the bubbles are broken, the coalesced fluid 1230 is passed through to the filter screen 1040, as indicated by the arrows, and the resultant air is passed upward through the vent 1060.

Figure 13:
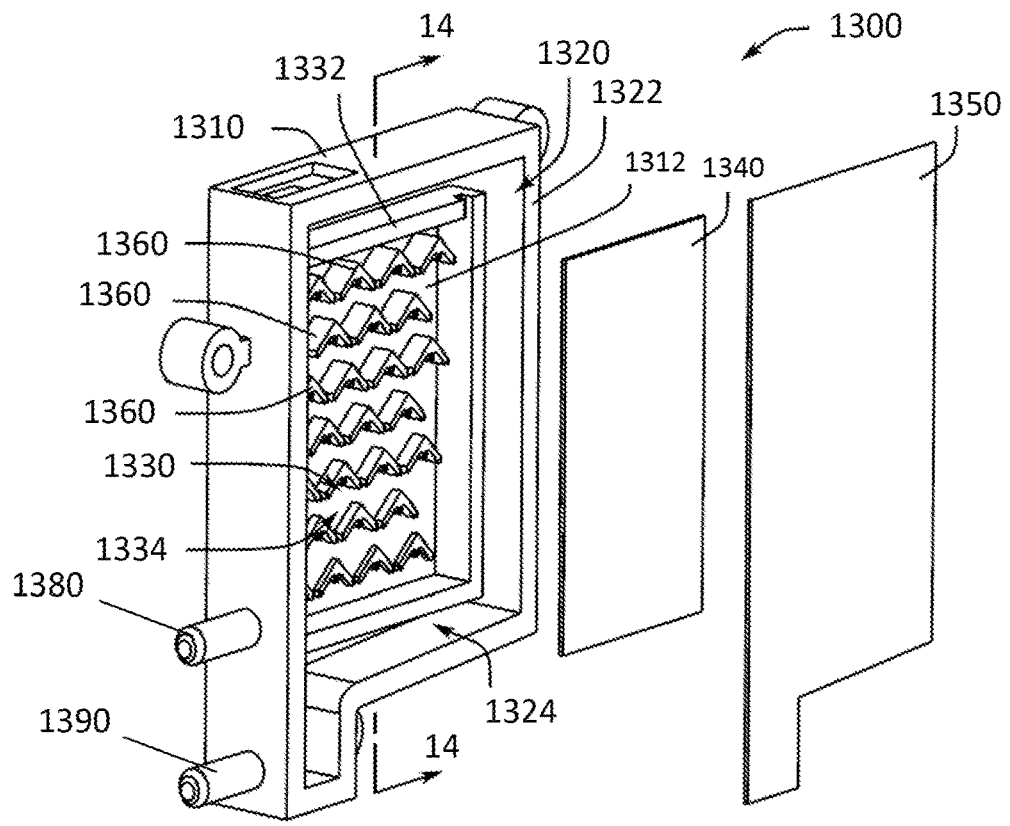
FIG. 13 is a perspective, exploded view of another example defrothing device.
Figure 14:
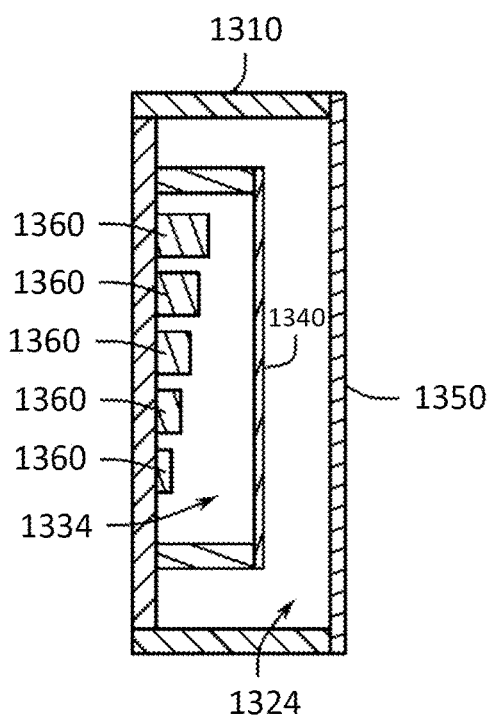
FIG. 14 is a cross-sectional view of the example defrothing device of FIG. 13 taken along 14-14.

Referring now to FIGS. 13 and 14, another example defrothing device 1300 is illustrated. The example device 1300 includes a frame 1310 with various features formed therein. In the example illustrated in FIGS. 13 and 14, the frame 1310 is provided with a wall 1312 on one side of the frame 1310. The opposite side of the frame 1310 is open and provided with an outer opening 1320 defined by an outer rim 1322 which substantially forms the perimeter of the outer opening 1320. In the example of FIGS. 13 and 14, the outer rim 1322 of the outer opening 1320 is also the outer perimeter of the frame 1310. In other examples, the outer rim 1322 of the outer opening may be separate from the outer-most portion of the frame.

The example frame 1310 of the example defrothing device 1300 of FIGS. 13 and 14 further includes an inner opening 1330 defined by an inner rim 1332 which substantially forms the perimeter of the inner opening 1330. The inner opening 1330 of the example frame 1310 is recessed from the outer opening 1320, as most clearly illustrated in the cross-sectional view of FIG. 14. In this regard, the distance between the wall 1314 of the frame 1310 and the outer rim 1322 is greater than the distance between the wall 1312 and the inner rim 1332.

As shown in the exploded view of FIG. 13 and the cross-sectional view of FIG. 14, a filter screen 1340 is mounted on the perimeter of the inner opening 1330 to form an inner chamber 1334. The example defrothing device 1300 is provided with a cover layer 1350 mounted on the perimeter of the outer opening 1320 to form an outer chamber 1324.

The example defrothing device 1300 of FIGS. 13 and 14 is provided with a series of bubble-breaking features 1360 positioned within the inner chamber 1334. In the example illustrated in FIGS. 13 and 14, the bubble-breaking features 1360 are positioned along the depth (left to right in FIG. 13) and along the height (up to down in FIGS. 13 and 14) of the inner chamber 1334. In various examples, the bubble-breaking features 1360 are integrally formed with the frame 1310. For example, the frame 1310 may be molded with the bubble-breaking features 1360 formed on the wall 1312 of the frame 1310.

In various examples, the size of the bubble-breaking features 1360 may increase with the height of the inner chamber 1334. As most clearly illustrated in FIG. 14, in the example defrothing device 1300, the width of the bubble-breaking features 1360 (e.g., the magnitude of protrusion from the wall 1314) increases with height. Thus, as froth is introduced into the bottom portion of the inner chamber 1334 through an inlet port 1380 and travels upward, the bubble-breaking features 1360 may progressively ensure breaking of smaller and smaller bubbles, with coalesced fluid being directed out of the outer chamber 1324 through an outlet port 1390. In one example, the uppermost bubble-breaking features 1360 are sized to provide a gap between the bubble-breaking feature 1360 and the filter screen 1340 that is no greater than the size of a single bubble. Thus, the gap between the uppermost bubble-breaking features 1360 and the filter screen 1340 is sized such that the bubbles are substantially in a single-wide formation.

In the illustrated example, the bubble-breaking features 1360 are formed in a chevron configuration. Thus, the example bubble-breaking features 1360 may be formed on the wall 1312 of a frame 1310 as an inverted v-shaped protrusions. The inverted v-shaped configuration of the example bubble-breaking features 1360 includes two side protrusions and a central post to facilitate breaking of bubbles traveling in the upward direction.

FIGS. 10-14 illustrate some examples of defrothing devices that may be used in the example fluid supply systems described herein. Of course, various other defrothing devices are possible and are contemplated within the scope of the present disclosure.

Figure 15:
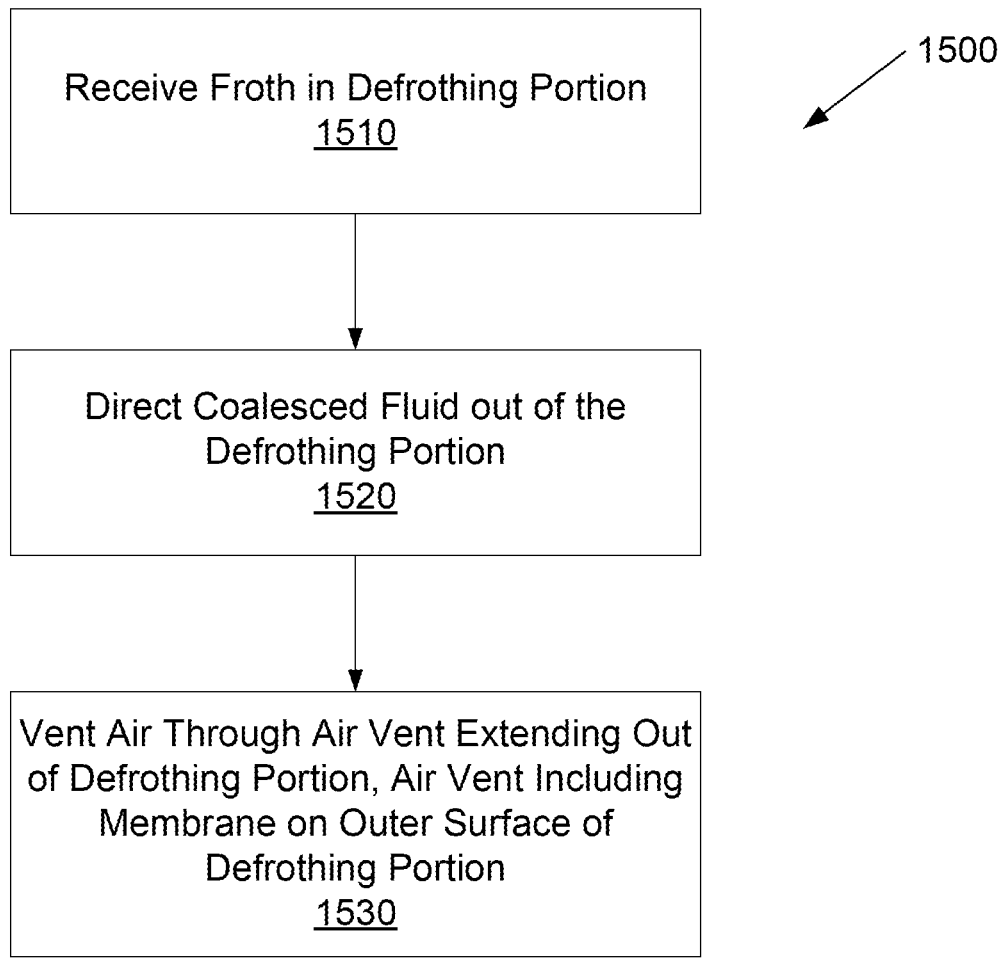
FIG. 15 is a flow chart illustrating an example process for coalescing froth.

Referring now to FIG. 15, a flow chart illustrates an example method for froth coalescing. The example method 1500 may be implemented in various devices, including the example devices described above with reference to FIGS. 1-14. In accordance with the example method 1500, froth is received in a defrothing portion of a defrothing device, where the defrothing portion is to separate froth into coalesced fluid and air (block 1510). For example, with reference to the example defrothing device 1000 of FIGS. 10 and 11, froth may be received in the defrothing device 1000 through the inlet port 1080. The froth is separated into a coalesced fluid and air in the defrothing device 1000 in the inner chamber 1034, for example.

In the example method 1500, coalesced fluid from the froth is directed out of the defrothing portion (block 1520). For example, in the example defrothing device 1000 of FIGS. 10 and 11, the coalesced fluid may be directed out of the defrothing device 1000 through the outlet port 1090.

In the example method 1500, air is vented from the defrothing portion through an air vent (block 1530). The air vent extends out of the defrothing portion and includes a membrane on an outer surface of the defrothing portion. For example, with reference to the example defrothing device 100 of FIG. 1, air is vented through the air vent 130. A membrane 140 is provided on the outer surface 112 of the defrothing device 100.

Thus, in various examples, venting of air from a defrothing device is facilitated by features that prevent fluid (e.g., froth which includes air and fluid) from escaping the defrothing device.

The foregoing description of various examples has been presented for purposes of illustration and description. The foregoing description is not intended to be exhaustive or limiting to the examples disclosed, and modifications and variations are possible in light of the above teachings or may be acquired from practice of various examples. The examples discussed herein were chosen and described in order to explain the principles and the nature of various examples of the present disclosure and its practical application to enable one skilled in the art to utilize the present disclosure in various examples and with various modifications as are suited to the particular use contemplated. The features of the examples described herein may be combined in all possible combinations of methods, apparatus, modules, systems, and computer program products.

It is also noted herein that while the above describes examples, these descriptions should not be viewed in a limiting sense. Rather, there are several variations and modifications which may be made without departing from the scope as defined in the appended claims.

What is claimed is:

1. A device, comprising:
   a defrothing portion to separate froth into a coalesced fluid and air;
   an air vent to vent the air from the defrothing portion, the air vent comprising a recess formed on an outer surface of the defrothing portion and a vent channel extending into an interior of the defrothing portion, the recess comprising a recess wall enclosing a recessed surface extending to the vent channel;
   a membrane positioned within the recess on the outer surface of the defrothing portion, the membrane being formed to engage the recess wall and the recessed surface, the membrane sealing the air vent, the membrane being formed of a material to prevent fluid from passing therethrough;
   a labyrinth formed on the outer surface of the defrothing portion with an opening at the recess wall, the labyrinth to interface with the membrane at the opening of the recess wall, the labyrinth being in fluidic communication with the air vent through the membrane; and
   a cover positioned over the membrane and at least a portion of the labyrinth.

2. The device of claim 1, wherein the membrane is formed of an oleophobic material.

3. The device of claim 1, wherein the air vent includes the vent channel having a cross-sectional shape with at least one corner.

4. The device of claim 3, wherein the cross-sectional shape of the vent channel includes at least one polygon.

5. The device of claim 1, wherein the cover is formed of a material having air-barrier properties.

6. The device of claim 1, further comprising:
   an inlet port extending into the defrothing portion; and
   an outlet port extending from the defrothing portion to direct the coalesced liquid out of the defrothing portion.

7. The device of claim 1, wherein the defrothing portion comprises:
   a frame having at least one outer opening and at least one inner opening recessed from the outer opening;
   at least one filter screen mounted on a perimeter of the at least one inner opening to form an inner chamber; and
   at least one cover layer mounted on a perimeter of the at least one outer opening to form an outer chamber,
   wherein the at least one filter screen separates the inner chamber from the outer chamber, and
   wherein the at least one filter screen prevents froth from crossing the at least one filter screen and allows coalesced fluid to cross the at least one filter screen into the outer chamber.

8. The device of claim 7, wherein the defrothing portion further comprises:
   a series of bubble-breaking features positioned within the inner chamber, the bubble-breaking features being positioned along a depth and a height of the inner chamber.

9. The device of claim 1, wherein the defrothing portion comprises:
   a substantially rectangular housing having an outer rim along at least one open face;
   at least one recessed rim being recessed from the outer rim and within the housing, the at least one recessed rim having a profile lying within the profile of the outer rim;
   a filter screen mounted on the at least one recessed rim, the filter screen to prevent froth from passing therethrough and to allow coalesced fluid from passing therethrough; and
   at least one cover layer mounted on the outer rim.

10. A device, comprising:
    a frame having an inlet port extending into the frame and an outlet port extending out of the frame;
    a defrothing portion to separate froth entering through the inlet port into a coalesced fluid and air, the coalesced fluid being directed to the outlet port;
    an air vent extending to an outer surface of the frame to vent the air, the air vent comprising a recess formed on the outer surface of the frame and a vent channel extending into an interior of the frame, the recess comprising a recess wall enclosing a recessed surface extending to the vent channel;
    a membrane positioned within the recess on the outer surface of the frame, the membrane being formed to engage the recess wall and the recessed surface, the membrane sealing the air vent and being formed of a material to prevent fluid from passing therethrough and to allow the air to pass therethrough;
    a labyrinth formed on the outer surface of the frame with an opening at the recess wall, the labyrinth to interface with the membrane at the opening of the recess wall, the labyrinth being in fluidic communication with the air vent through the membrane; and
    a cover positioned over the membrane and at least a portion of the labyrinth, the cover being formed of a material having air-barrier properties.

11. A method, comprising:
    receiving froth in a defrothing portion, the defrothing portion separating the froth into coalesced fluid and air;
    directing the coalesced fluid out of the defrothing portion;
    venting air through an air vent extending out of the defrothing portion, the air vent comprising a recess formed on an outer surface of the defrothing portion and a vent channel extending into an interior of the defrothing portion, the recess comprising a recess wall enclosing a recessed surface extending to the vent channel, the air vent including a membrane positioned within the recess on the outer surface of the defrothing portion, the membrane being formed to engage the recess wall and the recessed surface, the membrane sealing the air vent, the membrane being formed of a material to prevent fluid from passing therethrough;
    venting the air through a labyrinth formed on the outer surface of the defrothing portion with an opening at the recess wall, the labyrinth to interface with the membrane at the opening of the recess wall, the labyrinth being in fluidic communication with the air vent through the membrane; and
    sealing the air vent and at least a portion of the labyrinth with a cover positioned over the membrane and the at least a portion of the labyrinth, the cover being formed of a material having air-barrier properties.

* * * * *